United States Patent
Hayashi et al.

(10) Patent No.: US 11,587,240 B2
(45) Date of Patent: Feb. 21, 2023

(54) MOVING BODY DETECTING DEVICE, MOVING BODY DETECTING METHOD, AND MOVING BODY DETECTING PROGRAM

(71) Applicant: Qoncept, Inc., Tokyo (JP)

(72) Inventors: Kenichi Hayashi, Tokyo (JP); Shunsuke Nambu, Tokyo (JP)

(73) Assignee: QONCEPT, INC., Tokyo (JP)

( * ) Notice: Subject to any disclaimer, the term of this patent is extended or adjusted under 35 U.S.C. 154(b) by 388 days.

(21) Appl. No.: 16/777,006

(22) Filed: Jan. 30, 2020

(65) Prior Publication Data
US 2020/0250839 A1    Aug. 6, 2020

(30) Foreign Application Priority Data
Feb. 4, 2019   (JP) .............................. JP2019-017581

(51) Int. Cl.
    *G06T 7/246*    (2017.01)
(52) U.S. Cl.
    CPC .... *G06T 7/248* (2017.01); *G06T 2207/20221* (2013.01); *G06T 2207/30224* (2013.01)
(58) Field of Classification Search
    CPC . G06T 7/248; G06T 2207/20221; G06T 7/20; G06T 7/70
    See application file for complete search history.

(56) References Cited

U.S. PATENT DOCUMENTS

| | | | |
|---|---|---|---|
| 2011/0221890 A1 | 9/2011 | Yamashita | |
| 2012/0243733 A1 | 9/2012 | Sawai | |
| 2018/0373737 A1 | 12/2018 | Watanabe et al. | |
| 2019/0122370 A1* | 4/2019 | Hayashi | G06T 7/70 |

FOREIGN PATENT DOCUMENTS

| | | |
|---|---|---|
| JP | 2001273500 A | 10/2001 |
| JP | 2012138013 A | 7/2012 |

OTHER PUBLICATIONS

Ha, Jun et al., "A Detection System of Drowsy Driving based on Depth Information for Ship Safety Navigation", Journal of the Korean Society of Marine Environment and Safety. (Oct. 31, 2014) (7 pp.).
Office Action, KR10-2020-0010634, dated Apr. 9, 2021 (in English) (14 pp.).

\* cited by examiner

*Primary Examiner* — Myron Wyche
(74) *Attorney, Agent, or Firm* — Eversheds Sutherland (US) LLP (57) ABSTRACT

In tracking of a moving body using image data in detecting a target moving body having few externally outstanding features, such as coloring and a shape, from an image in an image frame, if an image of the target moving body overlaps a background image largely and their colorings are the same or similar to one another, it is difficult to detect the target moving body. A template image of the target moving body is superimposed on a background image of a region (periphery) of a candidate position of the target to generate a composite image and the moving body is detected based on a degree of match calculated through comparison of the composite image with an image of the region (periphery) of the candidate position of the target.

19 Claims, 6 Drawing Sheets

MOVING BODY DETECTING DEVICE, MOVING BODY DETECTING METHOD, AND MOVING BODY DETECTING PROGRAM

CROSS REFERENCE TO RELATED APPLICATIONS

This application is based upon and claims the benefits of priorities from Japanese Patent Application No. 2019-17581 filed on Feb. 4, 2019 and registered as Japanese Patent No. 6579727, the entire contents of which are incorporated herein by reference.

TECHNICAL FIELD

The present disclosure relates to a moving body detecting device, a moving body detecting method, and a moving body detecting program.

RELATED ART

Conventionally, there have been known devices that track a moving body using captured image data. These devices mostly focus on an external appearance feature such as an outside color and an outside shape to detect and track a target moving body (WO2012/127618). Meanwhile, Japanese Patent No. 6412998 discloses a device that highly accurately tracks a moving body even in the case where a target moving body has few externally outstanding features and a plurality of images similar to the target moving body are present in an image in an image frame. Generally, it is regarded to be difficult to track a moving body (for example, a ball in the baseball, the table tennis, or the like) having few externally outstanding features in coloring, the shape, and so on by relying on its external features.

BRIEF SUMMARY

There are difficulties in detecting the moving body having few externally outstanding features in the coloring, the shape, and so on from an image as described below.

For example, in detecting the target moving body from the image, in the case where the image of the target moving body largely overlaps with a background image and their colorings are the same or close to one another, it is regarded to be difficult to detect the target moving body. For example, in detecting a white ball as the target moving body from an image of a ball game, such as a baseball and a table tennis, since the white ball (the image of the target moving body) has few externally outstanding features in the coloring and the shape, it is difficult to accurately detecting the white ball, for example, in the case where the white ball largely overlaps with a white line (background image).

As in the above-described case, it will be difficult to track the moving body in a high degree of accuracy since it may happen that the target moving body is lost because of failing to be detected.

This disclosure is to reduce the difficulty in detection of a target moving body having few externally outstanding features in the coloring and the shape from an image in an image frame in tracking the moving body using image data.

In this disclosure, a moving body detecting device is a moving body detecting device capable of detecting a target moving body from an image in an image frame in tracking a moving body using image data, wherein the moving body detecting device includes:

a candidate position predicting unit configured to predict one or more candidate positions of the target moving body in the image frame;

a composite image generating unit configured to superimpose a template image of the target moving body (an image of an object corresponding to the target moving body) on a background image of a region (periphery) of the candidate position so as to generate a composite image;

a degree-of-match calculating unit configured to compare the composite image with an image of the region (periphery) of the candidate position to calculate a degree of match; and a moving body detecting unit configured to detect the target moving body from the image in the image frame based on the degree of match.

For example, one candidate position of the target moving body may be predicted, one template image and the background image of the region (periphery) of the one candidate position may be superimposed to generate a composite image, the composite image and the image of the region (periphery) of the candidate position may be compared to calculate the degree of match, and the target moving body may be detected based on the degree of match (for example, to be above a predetermined threshold). The above-mentioned example is included in claim 1, is included in claim 7, and is included in claim 13.

In this disclosure, the moving body detecting device may further include a template image generating unit configured to generate one or more template images from the image in the image frame and save the template image associated with information on a position of an object (corresponding to the target moving body) as a source of the template image.

In this disclosure, in the moving body detecting device, the composite image generating unit may be configured to be capable of scaling up or down the template image for the template image to have an appropriate size which is calculated from the candidate position of the target moving body in the image frame and the information of the position of the object as the source of the template image and then superimposing the thus-adjusted template image on the background image of the region (periphery) of the candidate position to generate the composite image. Or the composite image generating unit may be configured to be capable of adjusting the size of the template image based on the information of the position of the object as the source of the template image.

In this disclosure, in the moving body detecting device, the composite image generating unit may be configured to be capable of superimposing the template image where the position of the object as the source of the template image is the closest from the candidate position on the background image of the region (periphery) of the candidate position to generate the composite image. For example, any one of the first to $j^{th}$ template images may be selected based on the information of positions of the first to the $j^{th}$ objects and the candidate position (for example, to be the closest object to the candidate position). Here, j is the integer of one or more. Also, for example, if the first to $m^{th}$ candidate positions are predicted (Here, m is the integer of one or more.), composite images are generated by superimposing the predetermined template images on the regions (peripheries) of the candidate positions, respectively, degrees of match thereof are calculated by comparing the first to $m^{th}$ composite images with images of the regions (peripheries) of the first to $m^{th}$ candidate positions, based on the thus-obtained degrees of match (for example, in the descending order according to the degree), at least one candidate position may be selected, and the target moving body may be detected from the image in the image frame. Here, a plurality of candidate positions may be predicted in a plurality of image frames.

In this disclosure, a moving body detecting method is a moving body detecting method capable of detecting a target moving body from an image in an image frame in tracking a moving body using image data, wherein the method includes: a candidate position predicting step of predicting one or more candidate positions of the target moving body in the image frame; a composite image generating step of superimposing a template image of the target moving body on a background image of a region (periphery) of the or more candidate positions to generate one or more composite images; a degree-of-match calculating step of comparing each of the one or more composite images with an image of the region (periphery) of each of the or more candidate positions so as to calculate a degree of match for each combination; and a moving body detecting step of detecting the target moving body from the image in the image frame based on the degree of match.

In this disclosure, a moving body detecting program is a moving body detecting program capable of causing a computer to function to detect a target moving body from an image in an image frame in tracking a moving body using image data, wherein the program causes the computer to execute: a candidate position predicting step of predicting one or more candidate positions of the target moving body in the image frame; a composite image generating step of superimposing a template image of the target moving body on a background image of a region (periphery) of the candidate position so as to generate a composite image; a degree-of-match calculating step of comparing the composite image with an image of the region (periphery) of the candidate position to calculate a degree of match; and a moving body detecting step of detecting the target moving body from the image in the image frame based on the degree of match.

As described above, in this disclosure, the target moving body can be detected from the image in the image frame in tracking the moving body using the image data.

DETAILED DESCRIPTION OF EMBODIMENTS

A description will be given of embodiments of the disclosure with reference to the drawings. The overlapping description will be omitted, and identical reference numerals designate identical or equivalent parts in the respective drawings.

In this embodiment, a moving body detecting device is a moving body detecting device configured to detect a target moving body from an image in an image frame in tracking the moving body using image data. In this embodiment, the moving body detecting device is preferably employed to detect the target moving body in a device that highly accurately tracks the moving body having few externally outstanding appearance features in coloring, a shape, and so on in motion in accordance with a law of motion in a determined field, for example, like tracking of a motion of a ball in a ball game such as a baseball and a table tennis. This is merely an example and does not limit the application only to ball games.

Figure 1:
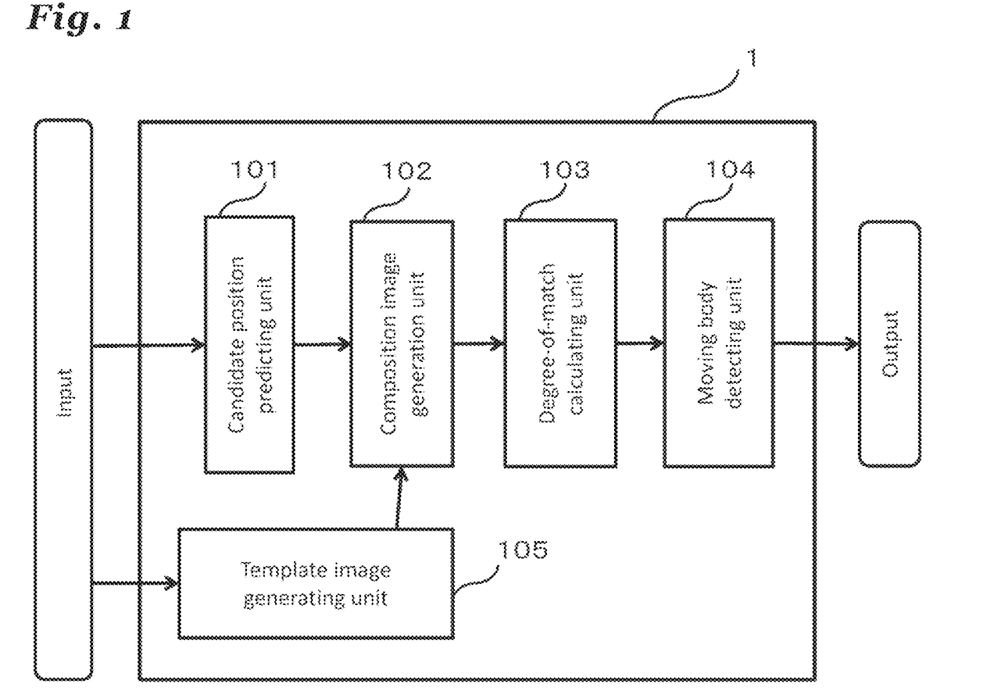
FIG. 1 shows a block diagram of a moving body detecting device.
Figure 2:
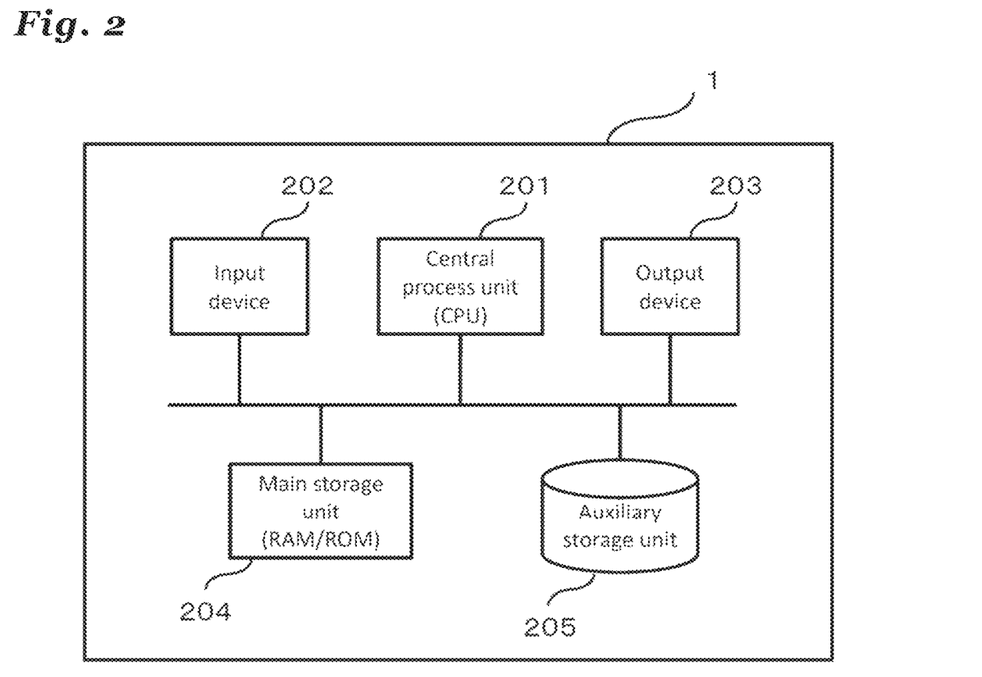
FIG. 2 shows a hardware configuration diagram of the moving body detecting device.

FIG. 1 shows a block diagram of a moving body detecting device 1. Not only a configuration configured as a device alone, the moving body detecting device 1 may have a configuration used by being incorporated into another device, such as a moving body tracking device, using image data. Another device incorporating the moving body detecting device 1 may be, for example, an electric appliance, such as a smart phone, an information mobile terminal, a digital camera, a game terminal, and a television. As illustrated in FIG. 2, the moving body detecting device 1 may be physically configured as a computer including a central processing unit (CPU) 201, an input device 202, an output device 203, a main storage unit (RAM/ROM) 204, and an auxiliary storage unit 205.

Each function of the moving body detecting device 1 is achieved by causing the central process unit (CPU) 201, the main storage unit (RAM/ROM) 204, and the like illustrated in FIG. 2 to read a program that causes the computer to function so as to detect the target moving body from the image in the image frame such that the input device 202 and the output device 203 are caused to operate by the control of the central processing unit (CPU) 201 and by executing reading and writing of data with the main storage unit (RAM/ROM) 204 and the auxiliary storage unit 205.

As illustrated in FIG. 1, the moving body detecting device 1 includes a candidate position predicting unit 101, a composite image generating unit 102, a degree-of-match calculating unit 103, a moving body detecting unit 104, and a template image generating unit 105. A plurality of images or a moving image captured by a camera or the like are/is given to the moving body detecting device 1 as consecutive image frames from the outside as an input. The moving body detecting device 1 outputs a coordinate in the image frame of the moving body detected as the target as information to identify the moving body detected as the target in the image frame to the outside as an output. Here, the output information only needs to be information that can identify the moving body detected as the target in the image frame and therefore it is not limited to only the coordinate.

Here, the consecutive image frames means that two image frames may be in a state where another image frame is absent between the two image frames, and it is not necessary for the image frame numbers of the two to be consecutive. For example, there may be the case where, even if two image frames are consecutive, their image frame numbers may not be necessarily consecutive since an image frame originally existing between the two image frames before the frame extraction process has been removed by the frame extraction process. The consecutive image frames may be forward consecutive image frames in terms of time or may be backward consecutive image frames in terms of time. When the moving body is tracked in the flow of the time, the consecutive image frames are the forward consecutive image frames in terms of the time, and when the moving body is tracked travelling back in the time, the consecutive image frames are the backward consecutive image frames in terms of the time.

The candidate position predicting unit 101 predicts one or more candidate positions of the target moving body in the image frame. From information on one or more image frames continuous with the image frame in which the candidate position of the target moving body is predicted (hereinafter, an objective image frame), the candidate position predicting unit 101 predicts one or more candidate positions of the target moving body in the objective image frame.

The composite image generating unit 102 superimposes a template image on a background image of a region (periphery) of the candidate position predicted by the candidate position predicting unit 101 to generate a composite image. While the template image of the target moving body is generated by the template image generating unit 105 in this embodiment, in this disclosure, the template image may be input from the outside or may be preliminarily given to the moving body detecting device 1. The background image is an image only a background where the target moving body is not reflected (taken or shown) as an image. The background image may be generated from one or more image frames continuous with the objective image frame or may be preliminarily given to the moving body detecting device 1. The "region (periphery)" or "region" or "periphery" refers to a predetermined range with in the center the candidate position predicted by the candidate position predicting unit 101 and the range may be so wide or to some extent that the degree-of-match calculating unit 103 can calculate a degree of match.

The degree-of-match calculating unit 103 compares the composite image generated by the composite image generating unit 102 with the image of the region (periphery) of the candidate position predicted by the candidate position predicting unit 101 so as to calculate the degree of match. Here, the "image of the region (periphery)" is, different from the background image of the region (periphery), an image of the region (periphery) of the candidate position including the target moving body when the target moving body is present inside the region (periphery). The degree of match is an extent of match quantitatively obtained from, for example, an error in pixels and a coefficient of correlation of both and/or between the composite image generated by the composite image generating unit 102 and the image of the region (periphery) of the candidate position predicted by the candidate position predicting unit 101. As long as the degree of match may be obtained, a method of calculating the degree of match is not questioned. Examples of the method include a Sum of Squared Difference (SSD) method that compares values found by summing square errors of respective pixel values, a Sum of Absolute Difference (SAD) method that compares values found by adding absolute values of errors in the respective pixel values, and a Normalized Cross-Correlation (NCC) method that compares coefficients of correlation of the respective pixel values.

The moving body detecting unit 104 detects the target moving body from the image in the objective image frame based on the degree of match calculated by the degree-of-match calculating unit 103. In the case where one target moving body is detected, the moving body determined as the closest match based on the degree of match is detected as the target. In the case where a plurality of candidates with respect to the target moving body are detected, for example, there are employable methods such as a method of extracting a given number of target moving bodies in the order of the closest match determined based on the degree of match and a method of excluding candidates that do not meet a predetermined condition from the target moving bodies to be extracted based on the degree of match.

Figure 3:
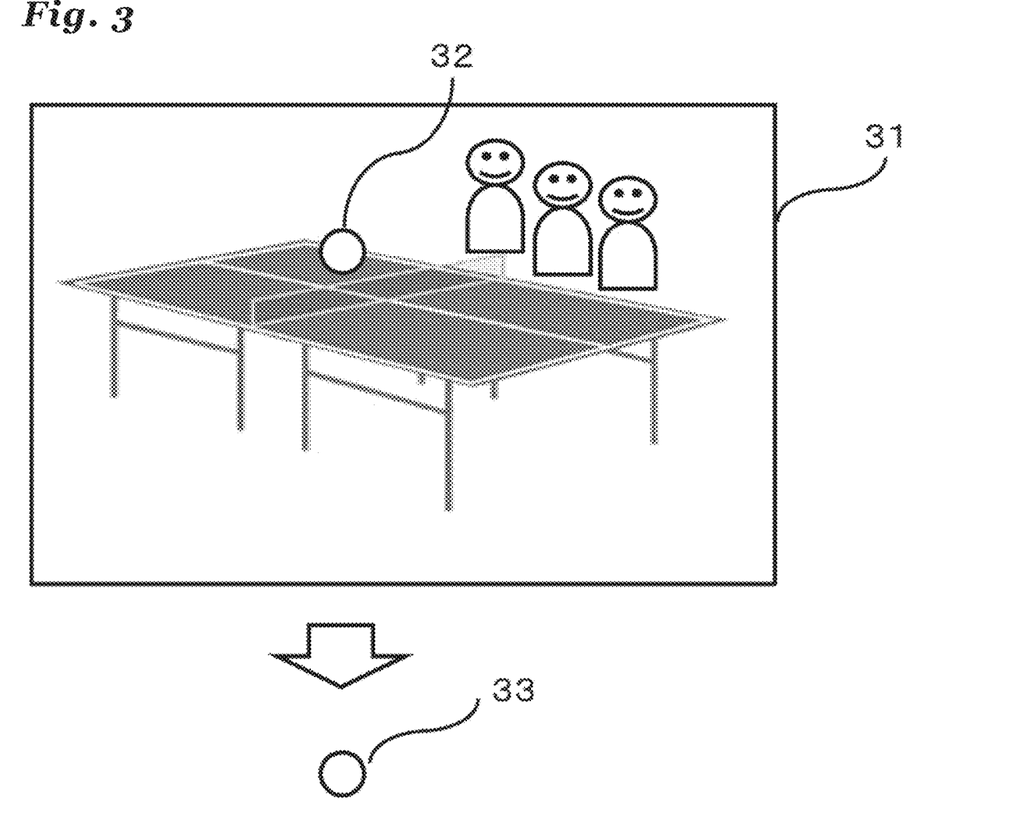
FIG. 3 shows a diagram schematically illustrating generation of a template image by an operation of a template image generating unit.

The template image generating unit 105 generates one or more template images from the image in the image frame and the template images are saved. FIG. 3 shows a diagram schematically illustrating generation of the template image by the operation by the template image generating unit 105. An image frame 31 used to generate the template image is selected from the image frames input to the moving body detecting device 1. The image frame 31 should be selected depending on not only a condition of an image frame in which the image of the target moving body is clear, but also a condition of an image frame in which the target moving body is easily lost in a relationship with the background and a condition of an image frame in which a brightness of the target moving body differs depending on a degree of illumination by the sunlight or an illumination lamp. The target image (here, an image 32 of a ball) is extracted from the image in the image frame 31 to generate a template image 33. For example, the template image 33 is generated by a method of indicating an outer edge of the target image 32 with a computer mouse or a stylus pen in the image of the image frame 31 displayed on a screen of the computer and defining a portion surrounded by the outer edge as the template image 33.

The template image generating unit 105 obtains information of the position of the target image 32, which is the source of the template image 33, together, such that the information is associated with the template image 33, and both the template image and the information are saved. The information of the position is defined by a predetermined coordinate system in the image frame. For example, with respect to the baseball, a two-dimensional coordinate system may be employed wherein the origin of the coordinate system is set to a pitcher's mound on the ground, X-axis is taken along an upward direction perpendicular to the ground, and Y-axis is taken along a direction from the pitcher's mound to a home base and with respect to the table tennis, a three-dimensional coordinate system may be employed wherein the origin is set to an intersection point between a perpendicular line from a center of a table-tennis table and a floor surface, X-axis is taken along a longitudinal direction of the table-tennis table, Y-axis is taken along a short side direction of the table-tennis table, i.e., a traverse direction to the X-axis, and Z-axis is taken along an upward direction perpendicular to the table-tennis table, i.e., the floor. As long as the position in the image frame can be identified, any kind of the coordinate system is used, and therefore it is not limited to the method of this embodiment.

The template image generating unit 105 generates one or more template images 33. Since the information of position associated with each template image 33 is saved, generating the plurality of template images 33 allows handling a difference depending on the position (for example, a difference in brightness of the image of the target moving body between at a sunny place and the shade). The specific method will be described later.

As described above, in this disclosure, the template image may be input from the outside or may be preliminarily given to the moving body detecting device 1. Here, the information of position may be associated therewith in the same manner as that of the template image 33. In such a case, it is not necessary to include the template image generating unit 105 in the system.

Next, the following describes an operation of the moving body detecting device 1 according to this embodiment. Here, in consideration of easy understanding of the following explanation, by way of example, an operation of the moving body detecting device that detects a white ball in a ball game will be explained as follows. The ball game, for example, may include a baseball, a table tennis, and so on.

Here, technical problems will be explained again in the case where the white ball is to be detected in the ball game. As described above, it is generally difficult to detect the white ball (the image of the target moving body), for example, in the case where the white ball and a white line (background image) are largely overlapped or else since the white ball has few externally outstanding features in the coloring, in the shape, and so on.

Figure 4:
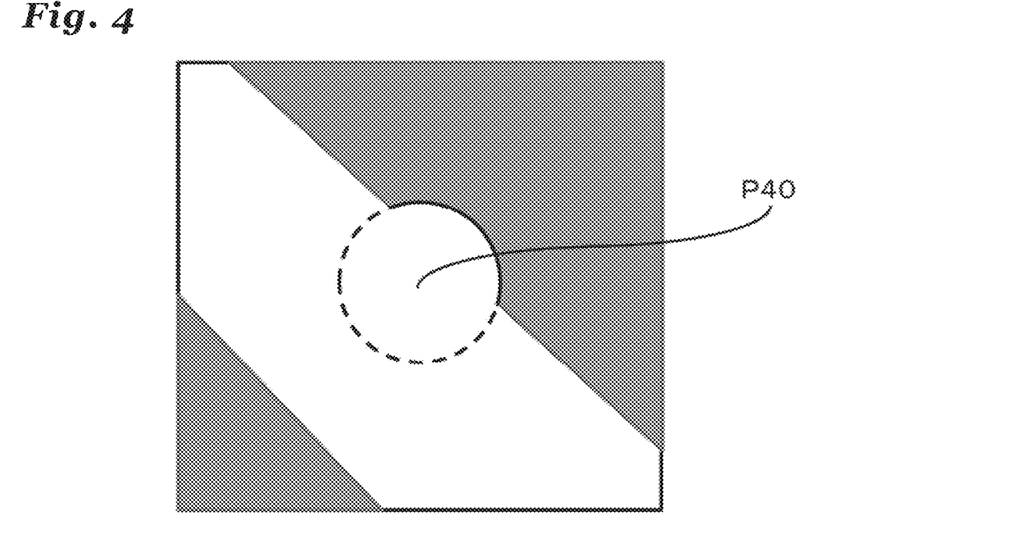
FIG. 4 shows a diagram schematically illustrating an example of an image in an objective image frame.

FIG. 4 schematically illustrates an example of an image in an objective image frame. FIG. 4 shows an example image in which the white ball (the image of the target moving body) and the white line (background image) are largely overlapped. The image in the objective image frame illustrated in FIG. 4 has a central coordinate of the ball at P40. Although the dashed line indicates an outer edge of the ball, both of the ball and a line of a background have the identical white color in the actual image such that the outer edge of the white ball cannot be distinguished. In the case where the method for detecting the target is a method of detection by a feature of a shape of the target, even though the coordinate of the predicted position of the target is similarly P40, since the shape of the ball cannot be determined from the image, the ball cannot be detected as the target.

Figure 5:
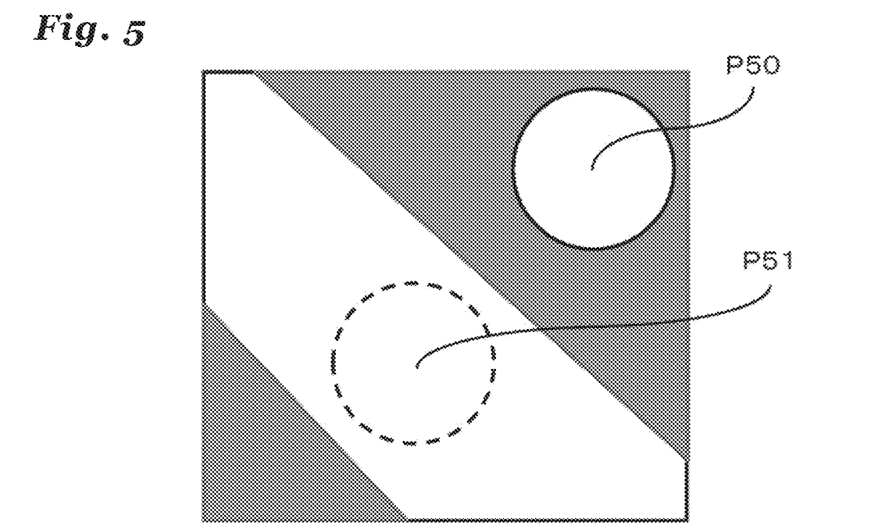
FIG. 5 shows a diagram schematically illustrating an example of an image in an objective image frame.

FIG. 5 schematically illustrates an example (an example different from that of FIG. 4) of an image in an objective image frame. FIG. 5 is an example in which a central coordinate of the white ball is P50 and an outer edge of the ball does not overlap with a white line. In the case where the method for detecting the target is a method of detection by a feature, such as coloring and a design of the target, when the coordinate of the predicted position of the target is P51, since both of the ball and a line of a background have the identical white colors, erroneous detection that the target is present at P51, the coordinate of the predicted position, occurs.

Thus, the tracking of the moving body using the image is likely to lose the white ball having the few externally outstanding features, such as the coloring and the shape, when the white ball goes across the white line on a competition field. The moving body detecting device 1 solves the problem by the operation described below.

Figure 6:
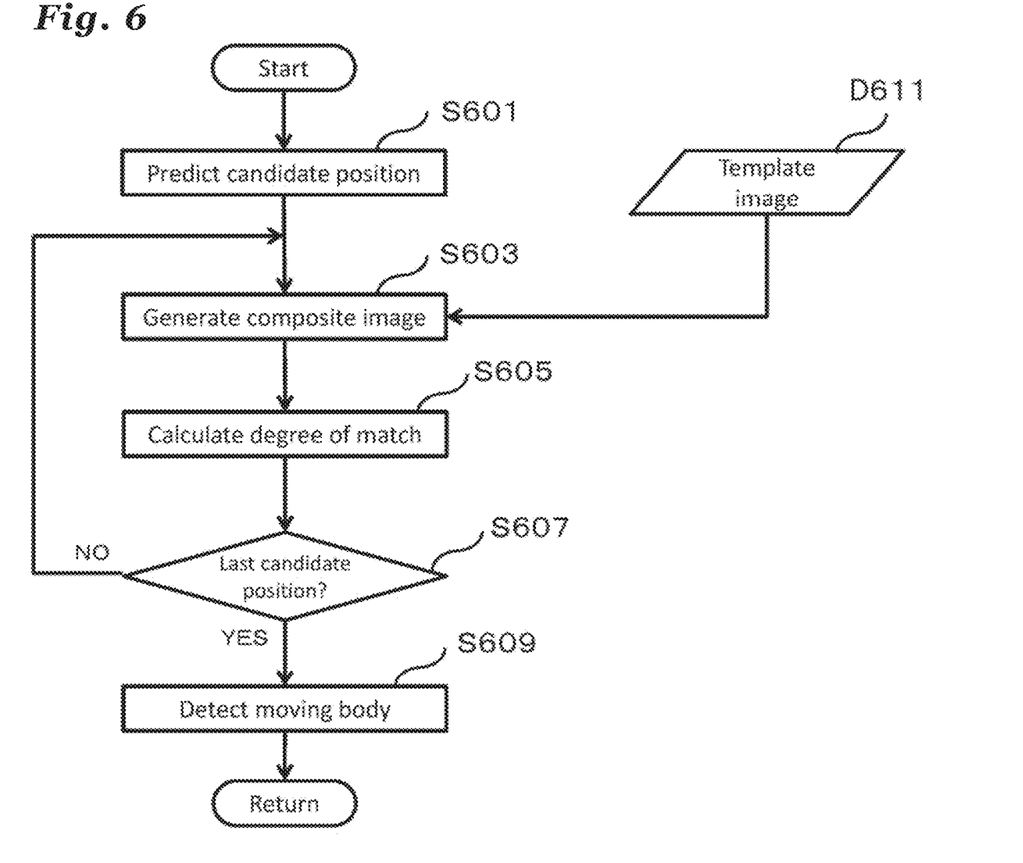
FIG. 6 shows a flowchart illustrating an operation of the moving body detecting device.

FIG. 6 shows a flowchart illustrating the operation of the moving body detecting device 1 according to this embodiment. The operation of the moving body detecting device 1 will be explained in accordance with the flowchart in FIG. 6.

The moving body detecting device 1 starts the operation when the information for detecting the target moving body in the objective image frame is input from the outside. The start of the operation may automatically begin after the input or may be caused by an explicit instruction.

When the moving body detecting device 1 starts the operation, before a process of S601 starts, the template image generating unit 105 generates the template image (D611). The generation method is as described above.

In a process at S601, the candidate position predicting unit 101 performs a process of predicting one or more candidate positions of the target moving body in the objective image frame from the information of one or more image frames continuous with the objective image frame so as to calculate a coordinate of the candidate position of the target moving body. The coordinate is calculated using the coordinate system in the predetermined image frame as described above.

Figure 7:
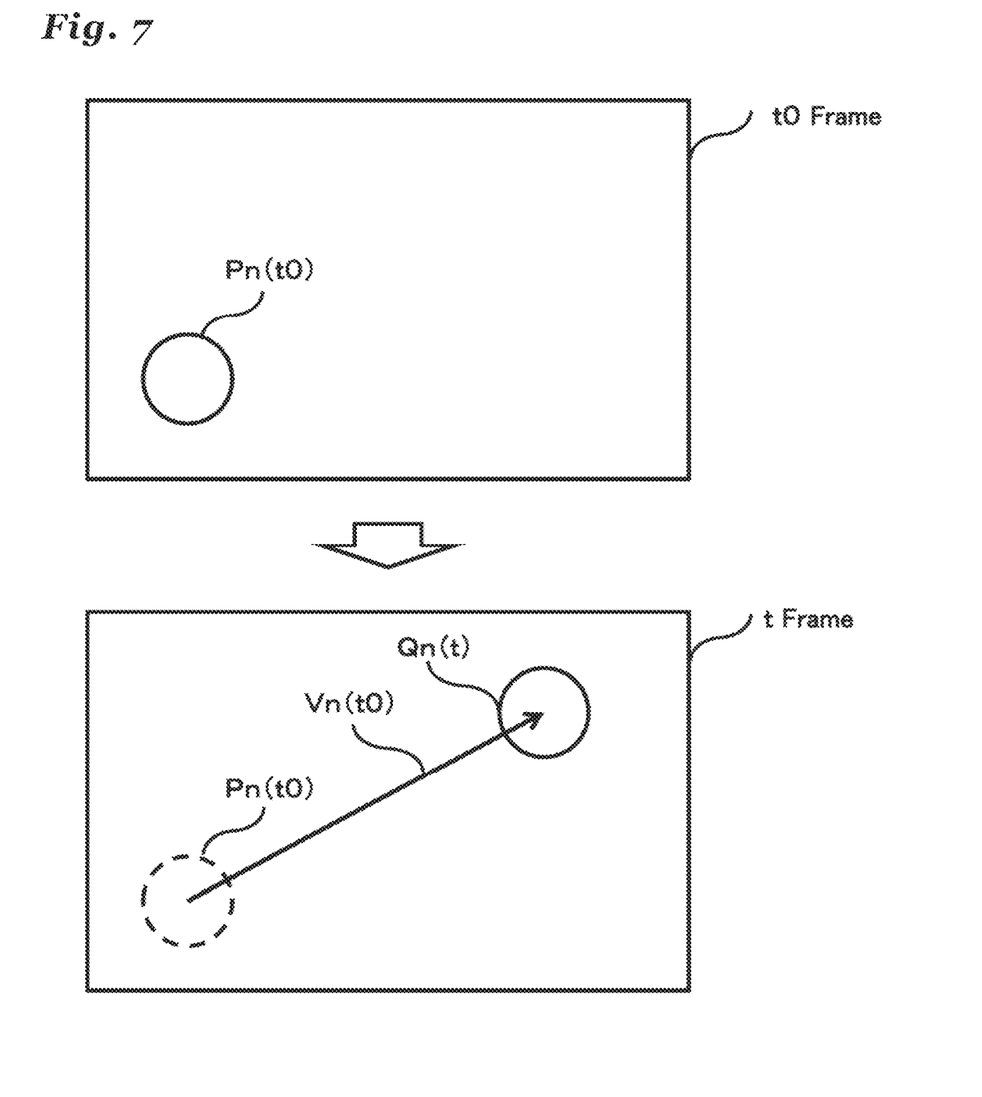
FIG. 7 shows a diagram schematically illustrating a process performed by a candidate position predicting unit.

FIG. 7 shows a diagram schematically illustrating the process at S601. With reference to FIG. 7, the following will describe a process that the candidate position predicting unit 101 predicts one or more candidate positions of the target moving body in the objective image frame from the information of one or more image frames continuous with the objective image frame. Here, it should be understood that, in this disclosure, the method for obtaining the predicted position is not limited to the method or way to obtain it in accordance with this embodiment.

A t0 frame and a t frame are consecutive image frames. $Pn(t0)$ indicates the n-th candidate for the target moving body in the t0 frame. $Vn(t0)$ indicates a velocity of $Pn(t0)$. $Qn(t)$ indicates the n-th predicted candidate for the target moving body in the t frame and is predicted as a position in the t frame based on $Pn(t0)$. The predicted position of $Pn(t0)$ in the t frame is obtained by $Qn(t)=Pn(t0)+Vn(t0)$. Alternatively, the predicted position of $Pn(t0)$ in the t frame may be obtained by $Qn(t)=Pn(t0)+Vn(t0)\cdot(t-t0)$.

To obtain the predicted position $Qn(t)$ of $Pn(t0)$ in the t frame, a condition on a position where the target moving body is present depending on a competition can be added. An example of a condition for table tennis is that a value of a Z coordinate of the predicted position $Qn(t).z$ has a value larger than a height of the table-tennis table.

In a process of S603, the composite image generating unit 102 performs a process of superimposing the template image (D611) of the target moving body on the background image of the region (periphery) of the candidate position predicted in the process of S601 so as to generate a composite image. The template image (D611) of the target moving body has been generated by the template image generating unit 105 prior to the process of S603. In the case where a plurality of candidate positions of the target moving body in the objective image frame are predicted in the process of S601, a process of S603 is performed on all predicted candidates (S607).

Figure 8:
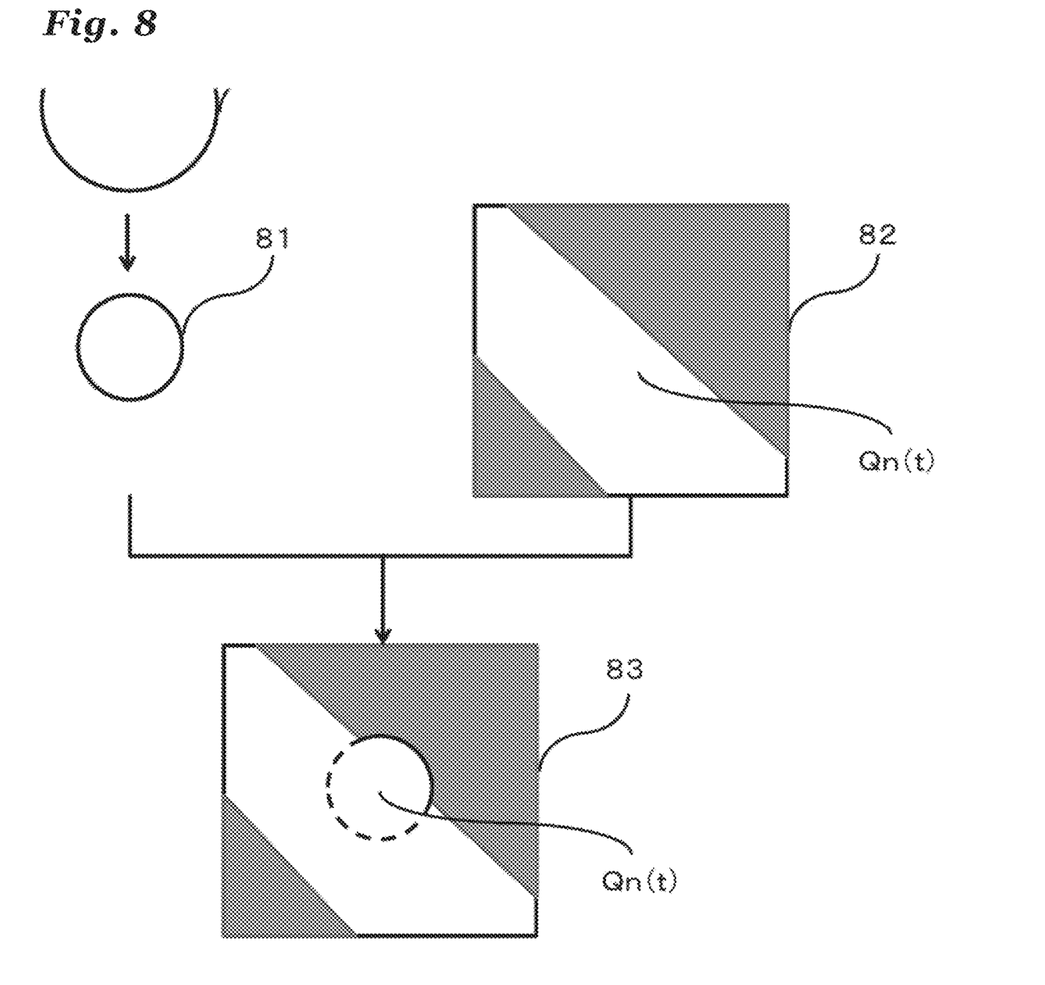
FIG. 8 shows a diagram schematically illustrating a process performed by a composite image generating unit.

FIG. 8 shows a diagram schematically illustrating the process of S603. With reference to FIG. 8, the following describes a process conducted by the composite image generating unit 102, and the process includes superimposing the template image (D611) of the target moving body on the background image of the region (periphery) of the candidate position predicted in the process of S601 so as to generate the composite image.

In the process of S603, first, the composite image generating unit 102 obtains the template image of the target moving body. The template image of the target moving body (white ball) is referred to 33. Here, it is assumed that a value of a radius of the ball in the template image 33 is referred to Ra.

In the process of S603, next, the composite image generating unit 102 scales up or down the obtained template image 33 of the target moving body such that the template image 33 may have an appropriate size for composition with the background image of the region (periphery) of the candidate position predicted in the process at S601. The template image of the target moving body is referred to 81 and the template image of the target moving body has been scaled up or down to the appropriate size for composition with the background image of the region (periphery) of the candidate position predicted in the process of S601 (FIG. 8). Thus, the template image processed as describe above is hereinafter referred to as a processed template image. Here, a value of a radius of the ball in the processed template image 81 is referred to as Rb. In this embodiment, the process of scaling up or down the template image 33 to have the appropriate size includes scaling up or down the template image 33 by Rb/Ra times in both length and breadth so as to generate the processed template image 81.

Figure 9:
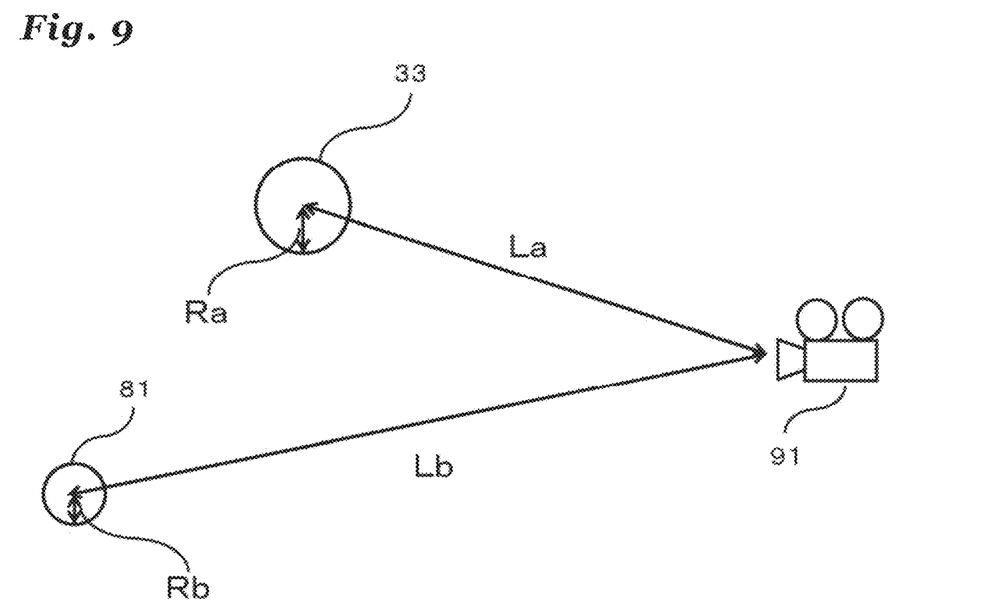
FIG. 9 shows a diagram illustrating a relationship between the template image and a processed template image.

FIG. 9 shows a diagram illustrating a relationship between the template image 33 and the processed template image 81. A distance from a position of a camera 91 that captures an image to a position of an object (corresponding to the target moving body), which is a source of the template image 33, is referred to as La, and a distance from the position of the camera 91 that captures the image to the candidate position predicted in the process of S601 is referred to Lb. When La<Lb is met, Ra>Rb is met, and when La>Lb is met, Ra<Rb is met. The composite image generating unit 102 calculates Rb to generate the processed template image 81 from the template image 33.

Ra is obtained from the image in the image frame. La and Lb are calculated from the coordinate of the position of the camera 91 that captures the image, the coordinate of the position of the object as the source of the template image 33, and the coordinate of the candidate position predicted in the process of S601. Since an apparent size of the object viewed from the position of the camera 91 is inversely proportional to the distance from the position of the camera 91, Rb is derived from these values by the following formula.

$$Rb=(La/Lb)\cdot Ra$$

In the process of S603, next, the composite image generating unit 102 generates the background image of the region (periphery) of the candidate position predicted in the process of S601. Returning to FIG. 8, 82 denotes the background image of the region (periphery) of the candidate position predicted in the process of S601. In FIG. 8, a white line is illustrated. In this embodiment, the background image has a square shape, each side of which has a length of K·Rb (K is a positive constant, K>2), and the candidate position Qn(t) predicted in the process of S601 is located at an intersection point of the diagonal lines of the square shape and has the same coordinate. A vale of K is set in an appropriate range such that the degree of match may be calculated in the degree-of-match calculation process (S605). FIG. 8 illustrates an example in which K=6 is set. Here, with respect to the definition of the background image of the region (periphery), it is only necessary to set the background image in such an appropriate range that the degree of match may be calculated in the degree-of-match calculation process (S605) and therefore it is not limited to the way of this embodiment.

In the process of S603, finally, the composite image generating unit 102 generates a composite image 83 such that the center of the generated background image 82 of the region (periphery) (the intersection point of the diagonal lines) may be set to the center of the processed template image 81 of the target moving body. Here, a dashed line in the composite image 83 in FIG. 8 indicates an outer edge of the processed template image 81 of the target moving body, but does not appear in the composite image in reality.

In the case where the template image generating unit 105 generates a plurality of template images (D611), the composite image generating unit 102 superimposes a template image associated with the position of the object as the source of the template image (D611) which is the closest from the candidate position on the background image of the region (periphery) of the candidate position so as to generate a composite image in the process of S603. In this way, the process can be appropriately performed even if features of the template images are caused to be different by their different positions (for example, difference in the brightness between the images of the target moving bodies located in the sunshine and in the shade).

In the process of S605, the degree-of-match calculating unit 103 performs a process of comparing the composite image generated in the process of S603 with the image of the region (periphery) of the candidate position predicted in the process of S601 so as to calculate the degree of match. In the case where a plurality of candidate positions of the target moving body in the objective image frame are predicted in the process of S601, a process of S605 is performed on every one of all predicted candidates (S607).

Figure 10:
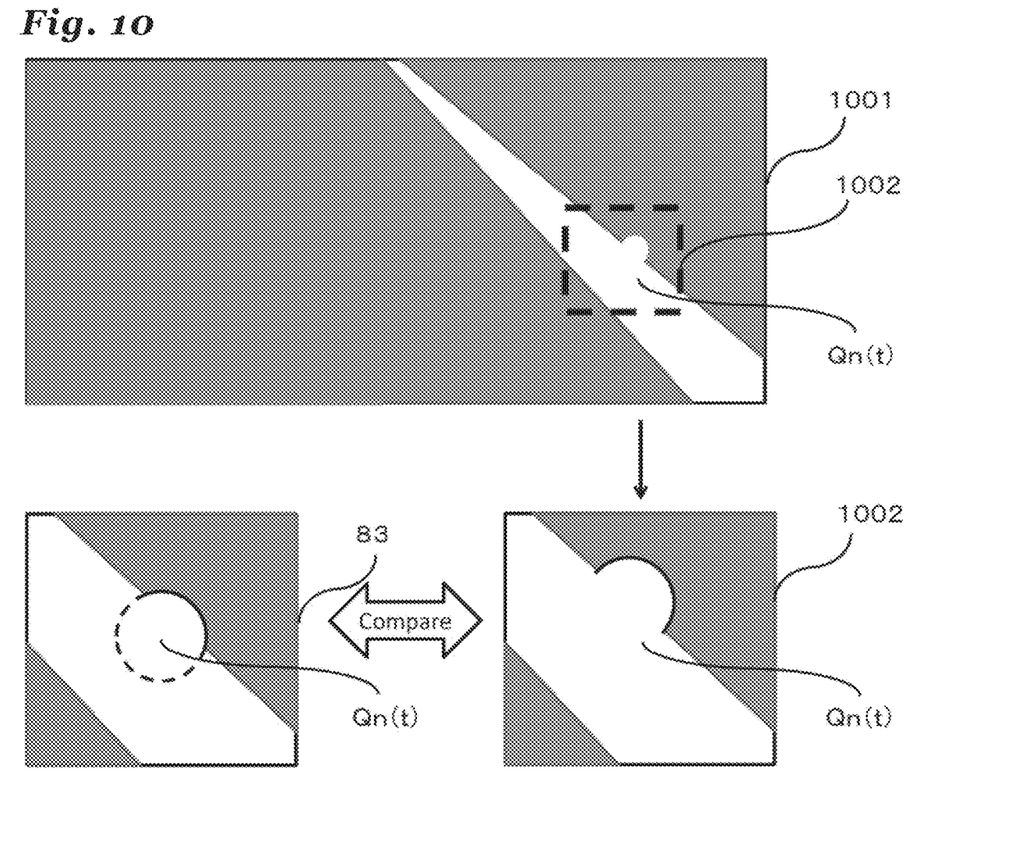
FIG. 10 shows a diagram schematically illustrating a process performed by a degree-of-match calculating unit.

FIG. 10 shows a diagram schematically illustrating a process of S605. With reference to FIG. 10, the following describes a process in which the degree-of-match calculating unit 103 compares the composite image generated in the process of S603 with the image of the region (periphery) of the candidate position predicted in the process of S601 so as to calculate the degree of match.

In the process of S605, the degree-of-match calculating unit 103 generates the image of the region (periphery) of the candidate position predicted in the process of S601. The objective image frame (t frame) is denoted by 1001. The image of the region (periphery) of the candidate position Qn(t) at the time of t predicted in the process of S601 in the t frame 1001 is denoted by 1002. The degree-of-match calculating unit 103 generates, as an image of region (periphery) 1002, a square shape, each side of which has a length of K·R (K is a positive constant, K>2), from the t frame 1001 such that an intersection point of the diagonal lines of the square shape may have the same coordinate as the candidate position Qn(t) at the time of t predicted in the process of S601.

In the process of S605, next, the degree-of-match calculating unit 103 compares the composite image 83 generated in the process of S603 with the image of region (periphery) 1002 of the candidate position predicted in the process of S601 so as to calculate the degree of match. The degree of match may be calculated by a method such as a Sum of Squared Difference (SSD) method of comparing values found by summing squared errors of respective pixel values, a Sum of Absolute Difference (SAD) method of comparing values found by adding absolute values of errors in the respective pixel values, and a Normalized Cross-Correlation (NCC) method of comparing coefficients of correlation of the respective pixel values. Here, as long as the degree of match may be obtained, the method for calculation is not limited to the methods of this embodiment.

In the case where a plurality of candidate positions of the target moving body in the objective image frame are predicted in the process of S601, the processes of S603 and S605 are performed for each of all predicted candidates. S607 is a recursive process for it.

In a process of S609, the moving body detecting unit 104 detects the target moving body from the image in the objective image frame based on the degree of match calculated in the process of S605. In the case where one target moving body is detected, the moving body determined as the closest match based on the degree of match is detected as the target. In the case where the plurality of candidates with respect to the target moving body are detected, a given number of targets are extracted in the order of the closest match determined based on the degree of match or candidates not meeting a certain or predetermined condition are excluded from the targets to be extracted based on the degree of match. Here, it should be understood that the method for detecting the plurality of candidates with respect to the target moving body is not limited to the method of this embodiment.

After detecting the target moving body in the objective image frame, the moving body detecting device 1 outputs a coordinate in the objective image frame to identify the moving body detected as the target and terminates a sequence of the processes. Here, it should be understood that the output information only has to be information that can identify the moving body detected as the target in the objective image frame and therefore it is not limited to that of this embodiment. The explanation of a moving body detecting program for causing the computer to function as the moving body detecting device 1 will be described as follows. The configuration of the computer is as illustrated in FIG. 2.

The moving body detecting program includes a main module, an input-output module, and an arithmetic processing module. The main module is a part that integrally controls image processing. The input-output module causes the computer to operate such that the input information, such as the image data in the image frame, is obtained and the coordinate in the objective image frame to identify the moving body detected as the target is output after a sequence of processes. The arithmetic processing module includes a candidate position predicting module, a composite image generating module, a degree-of-match calculating module, and a moving body detecting module. Functions achieved through execution of the main module, the input module, and the arithmetic processing module are similar to respective functions of the candidate position predicting unit 101, the composite image generating unit 102, the degree-of-match calculating unit 103, the moving body detecting unit 104, and the template image generating unit 105 in the moving body detecting device 1.

The moving body detecting program is provided by, for example, a storage medium such as a ROM, or a semiconductor memory. The moving body detecting program may be provided via the network.

As described above, in this embodiment, the moving body detecting device 1 superimposes the template image of the target moving body on the background image of the region (periphery) of the candidate position of the target so as to generate the composite image and detects the moving body based on the degree of match calculated through the comparison of the composite image with the image of the region (periphery) of the candidate position of the target, which may solve the technical problem that it is difficult to detect the target moving body from the image in the image frame when the target moving body has few externally outstanding features in the coloring, the shape, or the like in the case where the image of the target moving boy and the background image are overlapped largely and their coloring is the same, similar, or else.

What is claimed is:

1. A moving body detecting device that detects a target moving body from an image in an image frame in tracking a moving body using image data, the moving body detecting device comprising:
   a candidate position predicting unit configured to predict a candidate position of the target moving body in the image frame;
   a composite image generating unit configured to superimpose a template image of an object corresponding to the target moving body on a background image of a region of the candidate position to generate a composite image;
   a degree-of-match calculating unit configured to compare the composite image with an image of the region of the candidate position so as to calculate a degree of match; and
   a moving body detecting unit configured to detect the target moving body from the image in the image frame based on the degree of match.

2. The moving body detecting device according to claim 1, further comprising:
   a template image generating unit configured to generate the template image from an image of an existing region, in which the object corresponding to the target moving body exists, in a predetermined image frame and save the template image associated with information of a position of the object as a source of the template image.

3. The moving body detecting device according to claim 2,
   wherein the composite image generating unit is configured to scale up or down the template image to an appropriate size thereof and subsequently to superimpose the template image on the background image of the region of the candidate position so as to generate the composite image, the appropriate size being calculated from information of the candidate position and the position of the object.

4. The moving body detecting device according to claim 2, wherein:
   the predetermined image frame comprises a first predetermined image frame and a second predetermined image frame and, if necessary, a third predetermined image frame to a $j^{th}$ predetermined image frame;
   the object corresponding to the target moving body comprises a first object to a $j^{th}$ object corresponding the first to $j^{th}$ predetermined image frames, respectively;
   the template image comprises a first template image to a $j^{th}$ template image corresponding to the first to $j^{th}$ objects, respectively; and
   the composite image generating unit is configured to select one of the first to $j^{th}$ template images based on information of the candidate position and positions of the first to $j^{th}$ objects and superimpose a thus-selected template image on the background image of the region of the candidate position so as to generate the composite image.

5. The moving body detecting device according to claim 2, wherein:
   the candidate position of the target moving body comprises a first candidate position and a second candidate position and, if necessary, a third candidate position to a $m^{th}$ candidate position;
   the composite image comprises a first composite image to a $m^{th}$ composite image corresponding to the first to $m^{th}$ candidate positions, respectively;
   the composite image generating unit is configured to superimpose the template image on background images of regions of the first to $m^{th}$ candidate positions so as to generate the composite image comprising the first to $m^{th}$ composite images and save the first to $m^{th}$ composite images associated with the first to $m^{th}$ candidate positions, respectively;
   the degree-of-match calculating unit is configured to compare the first to $m^{th}$ composite images with images of the regions of the first to $m^{th}$ candidate positions, respectively, so as to calculate degrees of match thereof and save the degrees of match associated with the first to $m^{th}$ candidate positions; and the moving body detecting unit is configured to select at least one of the first to $m^{th}$ candidate positions based on the degrees of match so as to detect the target moving body from the image in the image frame based on the degrees of match.

6. The moving body detecting device according to claim 2, wherein:

the predetermined image frame comprises a first predetermined image frame and a second predetermined image frame and a third predetermined image frame to a $j^{th}$ predetermined image frame;

the object corresponding to the target moving body comprises a first object to a $j^{th}$ object corresponding the first to $j^{th}$ predetermined image frames, respectively;

the template image comprises a first template image to a $j^{th}$ template image corresponding to the first to $j^{th}$ objects, respectively;

the candidate position of the target moving body comprises a first candidate position and a second candidate position and a third candidate position to a $m^{th}$ candidate position;

the composite image comprises a first composite image to a $m^{th}$ composite image corresponding to the first to $m^{th}$ candidate positions, respectively;

the composite image generating unit is configured to select any one of the first to $j^{th}$ template images for each of the first to $m^{th}$ candidate positions based on information of the first to $m^{th}$ candidate positions and positions of the first to $j^{th}$ objects and superimpose a thus-selected template image on each background image of each region of each of the first to $m^{th}$ candidate positions so as to generate composite images including the first to $m^{th}$ composite images, and save the first to $m^{th}$ composite images associated with the first to $m^{th}$ candidate positions, respectively;

the degree-of-match calculating unit is configured to compare the first to $m^{th}$ composite images with images of the regions of the first to $m^{th}$ candidate positions, respectively, so as to calculate degrees of match thereof and save the degrees of match associated with the first to mth candidate positions; and the moving body detecting unit is configured to select at least one of the first to $M^{th}$ candidate positions based on the degrees of match so as to detect the target moving body from the image in the image frame based on the degree of match.

7. A moving body detecting device capable of detecting a target moving body from an image in an image frame in tracking a moving body using image data, the moving body detecting device comprising: a processor; an input device; an output device; and a storage device, wherein the processor in accordance with a stored program is operable to:

cause the input device to obtain input information;

predict a candidate position of the target moving body in the image frame;

superimpose a template image of an object corresponding to the target moving body on a background image of a region of the candidate position so as to generate a composite image;

compare the composite image with an image of the region of the candidate position to calculate a degree of match;

detect the target moving body from the image in the image frame based on the degree of match; and cause the output device to output output information.

8. The moving body detecting device according to claim 7, wherein the template image is generated from an image of an existing region, in which the object corresponding to the target moving body exists, in a predetermined image frame and save the template image associated with information of a position of the object.

9. The moving body detecting device according to claim 8, wherein the composite image is generated by scaling up or down the template image to an appropriate size thereof and subsequently superimposed on the background image of the region of the candidate position and the appropriate size is calculated from information of the candidate position and the position of the object.

10. The moving body detecting device according to claim 8, wherein:

the predetermined image frame comprises a first predetermined image frame and a second predetermined image frame and, if necessary, a third predetermined image frame to a $j^{th}$ predetermined image frame;

the object corresponding to the target moving body comprises a first object to a $j^{th}$ object corresponding the first to $j^{th}$ predetermined image frames, respectively;

the template image comprises a first template image to a $j^{th}$ template image corresponding to the first to $j^{th}$ objects, respectively; and the processor is operable to select one of the first to $j^{th}$ template images based on information of the candidate position and positions of the first to $j^{th}$ objects and superimpose a thus-selected template image on the background image of the region of the candidate position so as to generate the composite image.

11. The moving body detecting device according to claim 8, wherein:

the candidate position of the target moving body comprises a first candidate position and a second candidate position and, if necessary, a third candidate position to a $m^{th}$ candidate position;

the composite image comprises a first composite image to a $m^{th}$ composite image corresponding to the first to $M^{th}$ candidate positions, respectively; and the processor is operable to:

superimpose the template image on background images of regions of the first to $M^{th}$ candidate positions so as to generate the composite image comprising the first to $m^{th}$ composite images and cause the storage device to save the first to $M^{th}$ composite images associated with the first to $m^{th}$ candidate positions, respectively;

compare the first to $m^{th}$ composite images with images of the regions of the first to $M^{th}$ candidate positions, respectively, so as to calculate degrees of match thereof and cause the storage device to save the degrees of match associated with the first to $M^{th}$ candidate positions; and select at least one of the first to $M^{th}$ candidate positions based on the degrees of match so as to detect the target moving body from the image in the image frame based on the degrees of match.

12. The moving body detecting device according to claim 8, wherein:

the predetermined image frame comprises a first predetermined image frame and a second predetermined image frame and a third predetermined image frame to a $j^{th}$ predetermined image frame;

the object corresponding to the target moving body comprises a first object to a $j^{th}$ object corresponding the first to $j^{th}$ predetermined image frames, respectively;

the template image comprises a first template image to a $j^{th}$ template image corresponding to the first to $j^{th}$ objects, respectively;

the candidate position of the target moving body comprises a first candidate position and a second candidate position and a third candidate position to a $m^{th}$ candidate position;

the composite image comprises a first composite image to a $m^{th}$ composite image corresponding to the first to $m^{th}$ candidate positions, respectively; and the processor is operable to:

select any one of the first to $j^{th}$ template images for each of the first to $m^{th}$ candidate positions based on information of the first to $m^{th}$ candidate positions and positions of the first to $j^{th}$ objects and superimpose a thus-selected template image on each background image of each region of each of the first to $m^{th}$ candidate positions so as to generate composite images including the first to $m^{th}$ composite images, and cause the storage device to save the first to mth composite images associated with the first to $m^{th}$ candidate positions, respectively;

compare the first to $m^{th}$ composite images with images of the regions of the first to mth candidate positions, respectively, so as to calculate degrees of match thereof and cause the storage device to save the degrees of match associated with the first to $m^{th}$ candidate positions; and select at least one of the first to $m^{th}$ candidate positions based on the degrees of match so as to detect the target moving body from the image in the image frame based on the degrees of match.

13. A moving body detecting method that detects a target moving body from an image in an image frame in tracking a moving body using image data, the moving body detecting method comprising:

a candidate position predicting step of predicting a candidate position of the target moving body in the image frame;

a composite image generating step of superimposing a template image of an object corresponding to the target moving body on a background image of a region of the candidate position to generate a composite image;

a degree-of-match calculating step of comparing the composite image with an image of the region of the candidate position so as to calculate a degree of match; and a moving body detecting step of detecting the target moving body from the image in the image frame based on the degree of match.

14. The moving body detecting method according to claim 13, further comprising:

a template image generating step of generating the template image from an image of an existing region, in which the object corresponding to the target moving body exists, in a predetermined image frame and saving the template image associated with information of a position of the object.

15. The moving body detecting method according to claim 14, wherein the composite image generating step comprises scaling up or down the template image to an appropriate size thereof and subsequently superimposing the template image on the background image of the region of the candidate position so as to generate the composite image, the appropriate size being calculated from information of the candidate position and the position of the object.

16. The moving body detecting method according to claim 14, wherein:

the predetermined image frame comprises a first predetermined image frame and a second predetermined image frame and, if necessary, a third predetermined image frame to a $j^{th}$ predetermined image frame;

the object corresponding to the target moving body comprises a first object to a $j^{th}$ object corresponding the first to $j^{th}$ predetermined image frames, respectively;

the template image comprises a first template image to a $j^{th}$ template image corresponding to the first to $j^{th}$ objects, respectively; and the composite image generating step comprises selecting any one of the first to $j^{th}$ template images based on information of the candidate position and positions of the first to $j^{th}$ objects and superimposing a thus-selected template image on the background image of the region of the candidate position so as to generate the composite image.

17. The moving body detecting method according to claim 14, wherein:

the candidate position of the target moving body comprises a first candidate position and a second candidate position and, if necessary, a third candidate position to a $m^{th}$ candidate position;

the composite image comprises a first composite image to a $m^{th}$ composite image corresponding to the first to $m^{th}$ candidate positions, respectively;

the composite image generating step comprises superimposing the template image on background images of regions of the first to $m^{th}$ candidate positions so as to generate the composite image comprising the first to $M^{th}$ composite images and saving the first to $M^{th}$ composite images associated with the first to $m^{th}$ candidate positions, respectively;

the degree-of-match calculating step comprises comparing the first to $m^{th}$ composite images with images of the regions of the first to $m^{th}$ candidate positions, respectively, so as to calculate degrees of match thereof and saving the degrees of match associated with the first to $m^{th}$ candidate positions; and the moving body detecting step comprises selecting at least one of the first to mth candidate positions based on the degrees of match so as to detect the target moving body from the image in the image frame based on the degree of match.

18. The moving body detecting method according to claim 14, wherein:

the predetermined image frame comprises a first predetermined image frame and a second predetermined image frame and a third predetermined image frame to a $j_{th}$ predetermined image frame;

the object corresponding to the target moving body comprises a first object to a $j^{th}$ object corresponding the first to $j^{th}$ predetermined image frames, respectively;

the template image comprises a first template image to a $j^{th}$ template image corresponding to the first to $j^{th}$ objects, respectively;

the candidate position of the target moving body comprises a first candidate position and a second candidate position and, if necessary, a third candidate position to a $m^{th}$ candidate position;

the composite image comprises a first composite image to a $m^{th}$ composite image corresponding to the first to $m^{th}$ candidate positions, respectively;

the composite image generating step comprises selecting any one of the first to $j^{th}$ template images for each of the first to $m^{th}$ candidate positions based on information of the first to $m^{th}$ candidate positions and positions of the first to $j^{th}$ objects and superimposing a thus-selected template image on each background image of each region of each of the first to $m^{th}$ candidate positions so as to generate composite images including the first to $m^{th}$ composite images, and saving the first to $m^{th}$ composite images associated with the first to $m^{th}$ candidate positions, respectively;

the degree-of-match calculating step comprises comparing the first to $m^{th}$ composite images with images of the regions of the first to $m^{th}$ candidate positions, respectively, so as to calculate degrees of match thereof and saving the degrees of match associated with the first to $m^{th}$ candidate positions; and the moving body detecting step comprises selecting at least one of the first to $m^{th}$ candidate positions based on the degrees of match so as to detect the target moving body from the image in the image frame based on the degrees of match.

19. The moving body detecting method according to claim 14 wherein:

the candidate position predicting step comprises predicting one or more candidate positions of the target moving body in the image frame;

the composite image generating step comprises superimposing one or more template images of an object corresponding to the target moving body on one or more background images of one or more regions of the one or more candidate positions to generate one or more composite images, wherein the one or more template images are generated in the template image generating step;

the degree-of-match calculating step comprises comparing the one or more composite images with one or more images of the one or more regions of the one or more candidate positions so as to calculate one or more degrees of match; and the moving body detecting step comprises detecting the target moving body from the image in the image frame based on the one or more degrees of match.

\* \* \* \* \*